US009269470B1

(12) United States Patent
Corning

(10) Patent No.: US 9,269,470 B1
(45) Date of Patent: Feb. 23, 2016

(54) NEUTRON BEAM REGULATOR AND CONTAINMENT SYSTEM

(71) Applicant: Michelle Corning, Flagstaff, AZ (US)

(72) Inventor: Michelle Corning, Flagstaff, AZ (US)

( * ) Notice: Subject to any disclaimer, the term of this patent is extended or adjusted under 35 U.S.C. 154(b) by 0 days.

(21) Appl. No.: 14/525,506

(22) Filed: Oct. 28, 2014

(51) Int. Cl.

| | |
|---|---|
| ***H05H 3/06*** | (2006.01) |
| ***G01T 3/00*** | (2006.01) |
| ***G21K 1/00*** | (2006.01) |
| ***G21K 1/093*** | (2006.01) |

(52) U.S. Cl.
CPC . *G21K 1/093* (2013.01); *H05H 3/06* (2013.01)

(58) Field of Classification Search
USPC .................... 250/251, 269.4, 370.05, 390.01, 250/390.03, 393, 505.1, 526; 976/DIG. 004
See application file for complete search history.

(56) References Cited

U.S. PATENT DOCUMENTS 4,209,703 A * 6/1980 Delcroix ............... F03H 1/0056 250/423 R
7,968,838 B2 * 6/2011 Dent ........................ H05H 3/06 250/251
8,193,504 B2 * 6/2012 Gratton ..................... G01T 3/00 250/358.1
8,461,516 B2 * 6/2013 Dent ........................ H05H 3/06 250/251
2009/0095895 A1 * 4/2009 Dent ........................ H05H 3/06 250/251
2009/0272906 A1 * 11/2009 Gratton ................ G01V 5/0008 250/370.05
2011/0260043 A1 * 10/2011 Dent ........................ H05H 3/06 250/251

* cited by examiner

*Primary Examiner* — Bernard E Souw
(74) *Attorney, Agent, or Firm* — Invention To Patent Services; Alex Hobson

(57) ABSTRACT

A neutron beam regulator has a magnetic coil configured around a neutron beam between the neutron beam source and a target. The magnetic coil may be used to contain the neutron beam and reduce the scattering of neutron. Neutrons have a magnetic moment and can be affected by exposure to magnetics fields. The magnetic coil may be used to modulate the neutron beam shape, intensity, velocity, direction and polarization. A magnetic coil may extend substantially the entire distance between a neutron beam source and a target. A magnetic coil may be a discrete magnetic coil having a separate power input and output from other magnetic coils and a plurality of discrete magnetic coils may be configured around the neutron beam. A magnetic coil may be a spiral magnetic coil and may be continuous, or extends substantially from the neutron beam source to the target.

21 Claims, 8 Drawing Sheets

NEUTRON BEAM REGULATOR AND CONTAINMENT SYSTEM

BACKGROUND OF THE INVENTION

1. Field of the Invention

The present invention relates to a neutron beam regulator and containment system.

2. Background

Neutron beams are used in a variety of applications including analytical methods, cancer treatment and to treat or condition various materials. Neutron beams are used for scattering and diffraction material analysis of material properties and particularly the crystallinity of a material. The highly penetrating nature of neutron beams is used in the treatment of cancerous tumors. Another use of neutron beams is to treat materials, and particularly metals, wherein neutron bombardment lodges neutrons into the metal to effectively harden the metal. Neutron bombardment can create point defects and dislocations that stiffen or harden the materials. These and other uses of neutron beams can potentially expose people to neutron radiation and neutron activation, the ability of neutron radiation to induce radioactivity in body tissue or other substances and objects exposed thereto.

Neutron beam radiation protection generally utilizes radiation shielding, or placing a material around the beam, beam source and target that absorbs neutrons. Common neutron shielding materials include hydrocarbons, polyethylene, paraffin wax, concrete, boron containing materials including boron carbide, boron impregnated silica glass, borosilicate glass, high-boron steel, and water and heavy water. These shielding materials have varying levels of effectiveness and can become radioactive over time, thereby requiring them to be changed out. In addition, a shield may not be installed or properly positioned during use of a neutron beam, thereby exposing workers and the surrounding environment to neutron radiation.

Neutrons can be guided by a vacuum tube having an inner surface coated with a neutron reflector, such as nickel. This reduces the loss of neutrons through scattering of the beam. Although neutron guides can transport neutron beams, they do not act to focus or reduce beam divergence. Magnetic fields can be used to affect a neutron beam shape, intensity, velocity, direction and polarization. Magnetic fields generated by an electrical current running through a coil, for example, may be used to direct, intensify and contain a neutron beam. However, a neutron beam source, such as a neutron beam generator, may be operated independently of an electrical current generated magnetic field configured to direct and otherwise contain a neutron beam, leaving the system susceptible to operating in an unsafe condition when no other containment system is employed.

Materials or parts hardened through neutron bombardment may only require hardening over a particular area, or a higher degree of hardening in a particular region of the part. Current neutron bombardment systems provide a uniform dosing of neutrons to the material or part and do not enable a gradient of hardening.

SUMMARY OF THE INVENTION

The invention is directed to a neutron beam regulator and containment system. Neutrons have a magnetic moment and can be affected by exposure to magnetics fields. The shape, intensity, velocity, direction and polarization of a neutron beam can be manipulated through magnetic field exposure. In an exemplary embodiment, a neutron beam regulator, or the present invention, comprises a magnetic coil configured around a neutron beam between a neutron beam source and a target. A magnetic coil may extend substantially the entire distance between a neutron beam source, or outlet of the beam source, and a target. In an exemplary embodiment, a magnetic coil is configured to extend at least partially around a neutron beam source to further contain and direct the neutrons and thereby reduce neutron radiation exposure outside proximal to the beam source. In another exemplary embodiment, a magnetic coil is configured to extend at least partially around a target. For example, a target may be configured to fit within a work piece station and a magnetic coil may extend around a portion of the work-piece station. A work-piece station may be configured to index in and out of a magnetic coil, whereby a work-piece can be loaded into the work-piece station and then positioned at least partially with the magnetic coil or magnetic field produced by the coil. Again configuring the magnetic coil and/or directing the field around a work-piece will further contain and direct the neutrons and thereby reduce neutron radiation proximal to the target or outside of a target area.

In an exemplary embodiment, a neutron beam regulator comprises a power control system that is configured as a safety system to ensure that the neutron beam is not operational unless a containing magnetic coil is powered on. An exemplary power control system comprises a magnetic coil power supply output, a neutron beam source power supply output, a magnetic coil power sensor, and a power safety feature. The power safety feature ensures that the neutron beam generator will not receive power from the power control system unless the magnetic coil is receiving power and producing a confining magnetic field, thereby effectively containing the neutron beam. A magnetic coil power supply sensor is configured to detect when the magnetic coil is operating and the power safety feature is configured to prevent power supply to said neutron beam source power supply output unless the magnetic coil power supply sensor detects that the magnetic coil is on. In embodiments with a plurality of discrete magnetic coils that may have their own coil power output, a single power supply may be configured to power each of the coil power outputs. A magnetic coil power sensor may be configured with this single power supply. The power supply to a neutron beam source power supply output may be cut-off by any suitable means including a switch that is opened in the event that the magnetic coil sensor detects that no power is being delivered to the magnetic coil(s).

Any suitable type of magnetic coil may be configured around a neutron beam including a continuous magnetic coil and discrete magnetic coils. A magnetic field may be generated by electromagnets, or any suitable electrical current carrying material. In an exemplary embodiment, a magnetic coil comprises an electrically conductive wire that extends completely around the neutron beam, or 360 degrees around the beam. In some cases a magnetic coil is configured as a discrete magnetic coil or ring that extends around the neutron beam. A discrete magnetic coil extends a portion of the neutron beam length, or distance from the neutron beam source or outlet to a target, including, but not limited to, no more than about one quarter of the neutron beam length, no more than about one third of the neutron beam length, no more than one half of the neutron beam length and any range between and including the discrete magnetic coil extension lengths. Any suitable number of discrete coils may be configured around the neutron beam including, but not limited to, 2 or more, 4 or more, 6 or more, 10 or more, twenty or more and any range between and including the number of coils provided. In another embodiment a magnetic coil is configured as a continuous coil that winds around the neutron beam in a substantially continuous manner or substantially the entire neutron beam length. A continuous coil, as defined herein, extends at least about three quarters of the neutron beam length.

A magnetic coil may comprise a single continuous wire or a plurality of wires that may be bundled or otherwise configured in a coil or ring around the neutron beam. In an exemplary embodiment, a single continuous coil is configured around a neutron beam and extends from a neutron beam source to a target. In another embodiment, a plurality of discrete coils are configured along the neutron beam between the beam source and the target.

The magnetic coils may be configured in any suitable manner around the neutron beam. In one embodiment, one or more discrete magnetic coils are configured proximal to the neutron beam and a continuous magnetic coil is configured around or outside of the one or more discrete magnetic coils. In this embodiment, the outer continuous magnetic coil may be configured primarily as a neutron beam containment coil to reduce neutron radiation leakage. In addition, in this embodiment, the one or more discrete magnetic coils may be independently powered by a beam modulator controller to provide a modulating magnetic field that is configured to change the properties of the neutron beam as desired. A beam modulator controller is configured to enable modulation of the electrical current to the discrete coils and therefore modulation of the magnetic field intensity or direction. For example, the magnetic field intensity of a first magnetic coil configured proximal to a neutron beam source may be higher, such as two times or more, the magnetic field intensity of a second magnetic coil configured more proximal to a target. The magnetic field may be modulated to change the shape, intensity, velocity, direction and polarization of a neutron beam. The magnetic field may be modulated to ensure a sufficient level of containment of the neutron beam depending on the neutron beam source or type, the length of the beam from the source to the target and the like. In addition, a magnetic field may be modulated to increase the amount of exposure of a particular incident surface. An incident surface may be a material for analysis, a material for hardening through the bombardment with a neutron beam, a patient tissue or cancer tumor location and the like.

A neutron beam regulator may comprise a work-piece station that is configured to retain a work-piece for exposure to a neutron beam configured within a magnetic field. In an exemplary embodiment, a work-piece station is configured to move and thereby move the location of the incident neutron beam on the work-piece surface. A neutron beam regulator may be configured with a modulating magnetic coil that is configured to receive a variable power input from the beam modulator controller. The work-piece may be positioned and indexed to change the location of the incident neutron beam and the intensity of the neutron beam may be modulated to enable variable conditioning or treatment of the work-piece surface. For example a first portion of a work-piece surface may be exposed to a higher intensity beam and therefore have a higher hardness, and a second portion of a work-piece may be exposed to a lower intensity neutron beam and have a resulting lower hardness. This combination of neutron beam intensity modulation along with work-piece positioning enables complete tailoring of work-piece treatment conditions heretofore not available. This same principle may be used to also provide specific and more precise treatment of cancerous tumors, whereby the tumor itself may be exposed to a much higher neutron beam intensity than surrounding tissue. This controlled method may reduce damage to surrounding tissue and more effectively treat a tumor.

In an exemplary embodiment, a neutron beam regulator system is configured with at least one magnetic coil that extends around a neutron beam between a neutron beam source and a target, a work-piece station and a treatment control system. A treatment control system is configured with a beam modulator controller to control the power supply to the magnetic field and therefore the intensity of the neutron beam. In addition, a treatment control system may comprise a beam location program configured to track the location of a neutron beam with respect to an incident surface, such as on a work-piece or proximal a tumor. A beam modulator controller may be configured to vary a property of a neutron beam as a function of said neutron beam location. As described, this type of system enables a tailored treatment function and this may be programmed into the treatment control system. A neutron beam regulator system comprising a treatment control system may also comprise a power control system and the treatment control system may be configured with the power control system. A one-piece unit may house both the treatment control system and the power control system.

A novel method of regulating a neutron beam source is provided by any of the embodiments of the neutron beam regulator as described herein. In one exemplary method, a neutron beam source and magnetic coil are both plugged into a power control system. The power control system is powered on thereby enabling power supply to both the magnetic coil and the neutron beam generator and thereby substantially containing the neutron beam within the magnetic coil. The magnetic coil power sensor is configured to monitor the power supply to the magnetic coil and in the event of a loss of power being drawn by the magnetic coil, the power supply to the neutron beam source will be terminated. It is to be understood that a threshold power draw level may be set for the magnetic coil power supply output and the magnetic coil power sensor may be configured to detect a power draw below this threshold level and thereby terminate power to the neutron beam source.

The neutron beam regulator system, as described herein, may effectively keep neutrons outside of the containment and/or modulating magnetic coils, thereby creating an exclusion zone. In some environments, labs and processing facilities for example, it may be important to exclude any neutrons from entering into the exclusion zone as they may interfere with the neutron beam.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
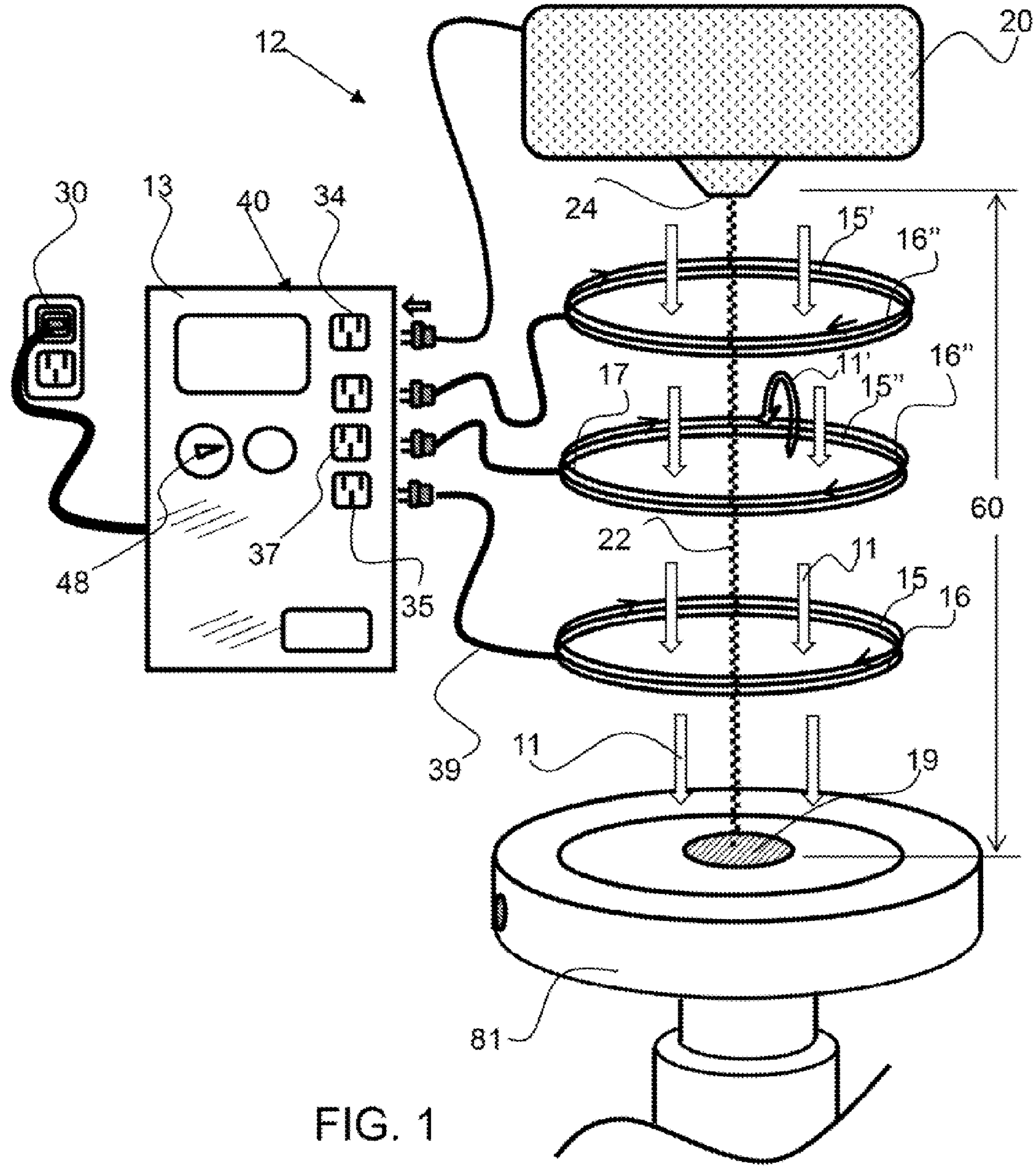

FIG. 1 shows a perspective view of an exemplary neutron beam regulator system comprising a power control system and a plurality of discrete magnetic coils configured around a neutron beam and extending substantially from the neutron beam source to the target, or the neutron beam length.

Figure 2:
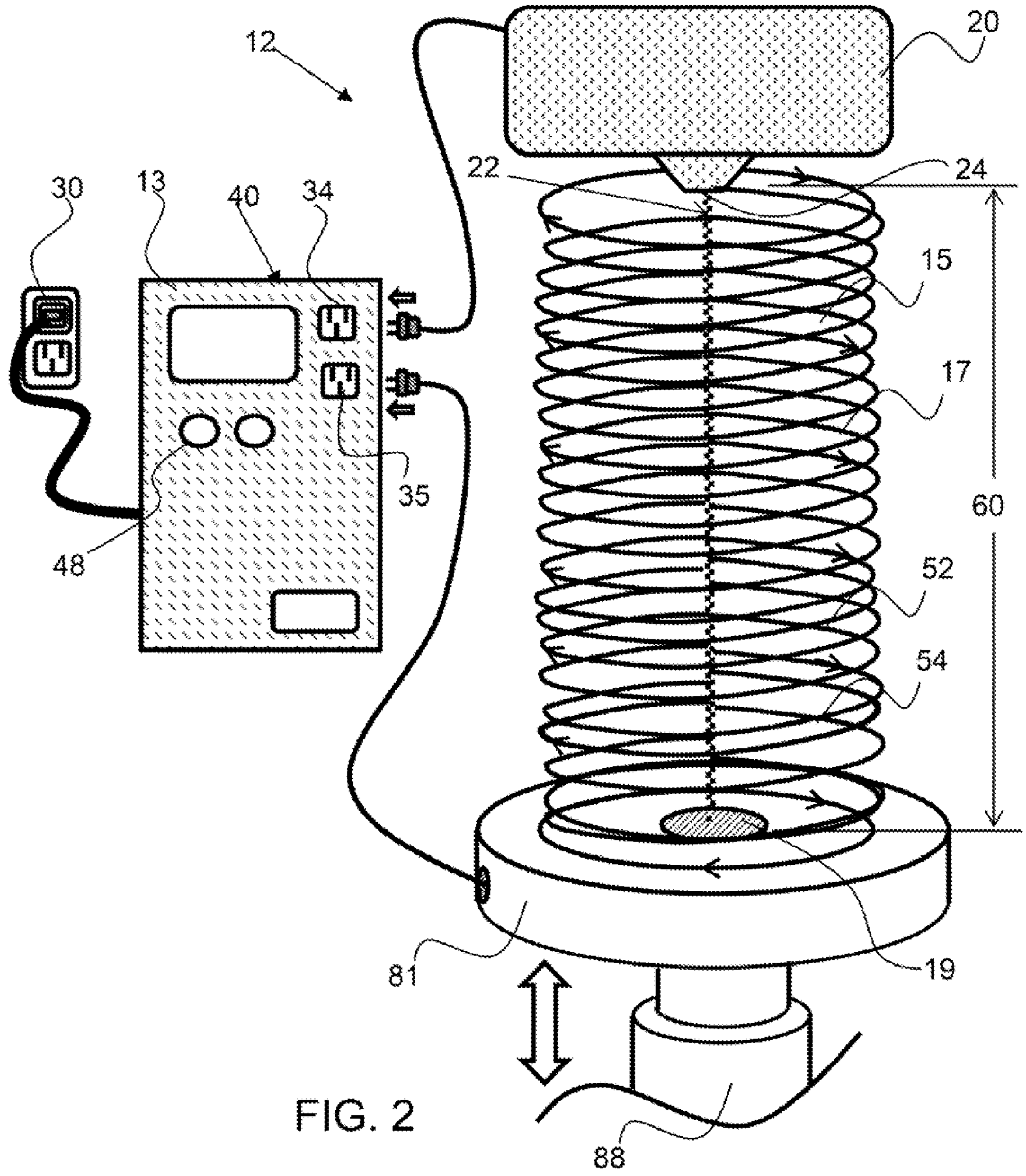

FIG. 2 shows a perspective view of an exemplary neutron beam regulator system comprising a continuous magnetic coil configured around a neutron beam and extending substantially the entire neutron beam length.

Figure 3:
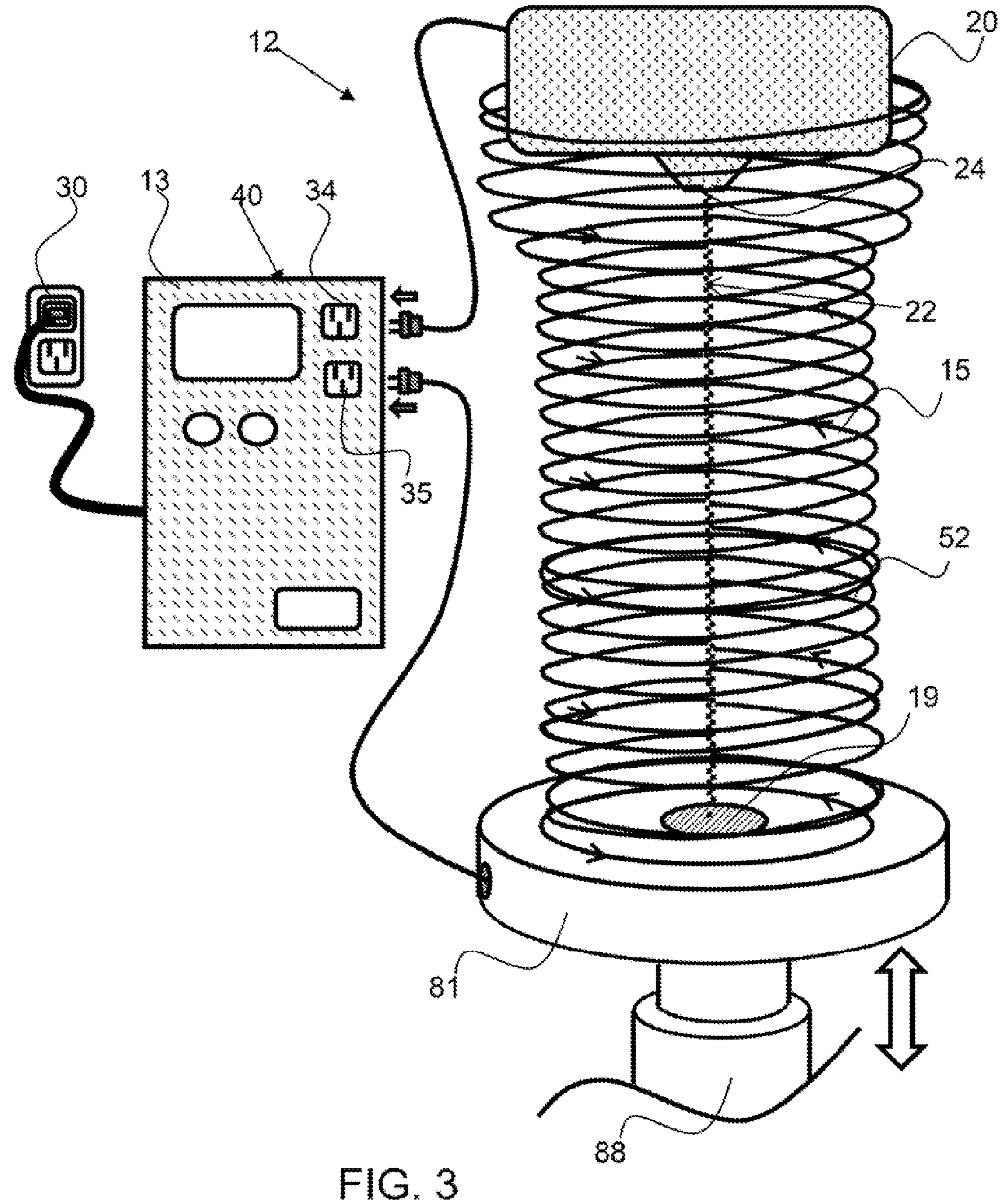

FIG. 3 shows a perspective view an exemplary neutron beam regulator system comprising a continuous magnetic coil configured partially around the neutron beam source or generator.

Figure 4:
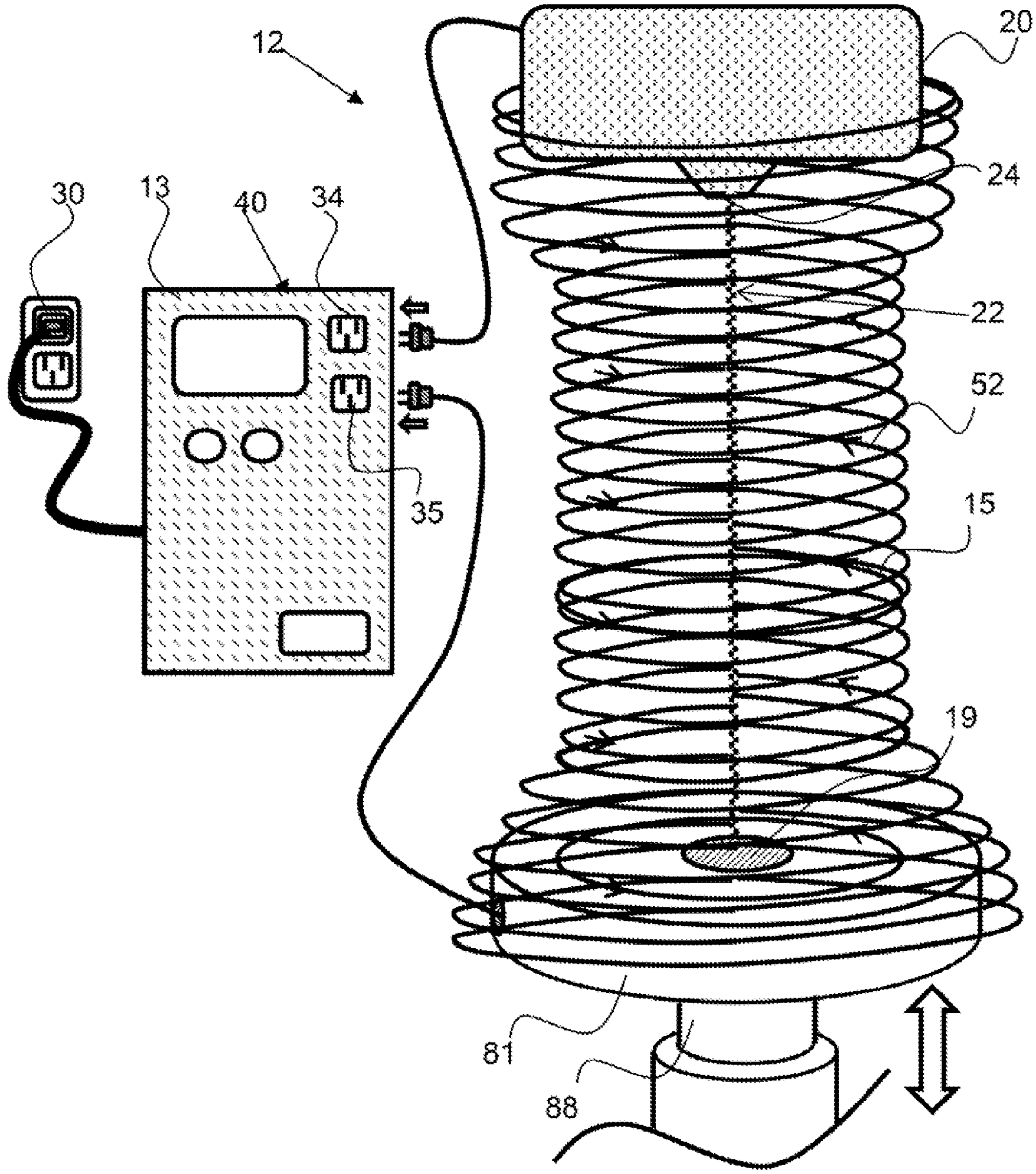

FIG. 4 shows a perspective view of an exemplary neutron beam regulator system comprising a continuous magnetic coil configured partially around the neutron beam source or generator and partially around a work-piece station.

Figure 5:
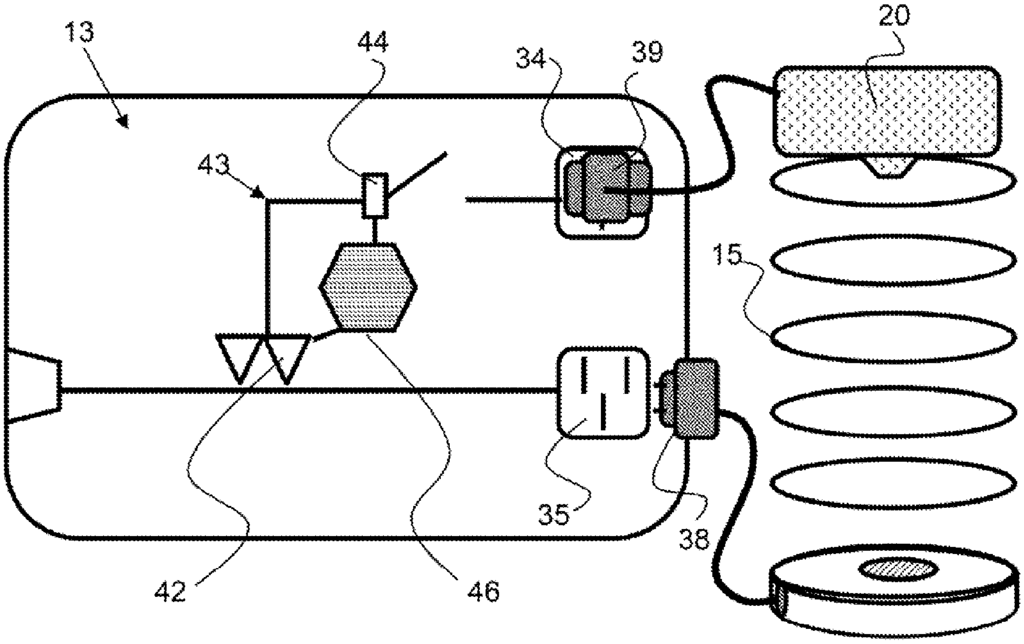

FIG. 5 shows a diagram of an exemplary power control system comprising a power safety feature configured to terminate power to a neutron beam source in the event that no power is being drawn by a containment magnetic coil. The switch is in an open position and the neutron beam source is deactivated.

Figure 6:
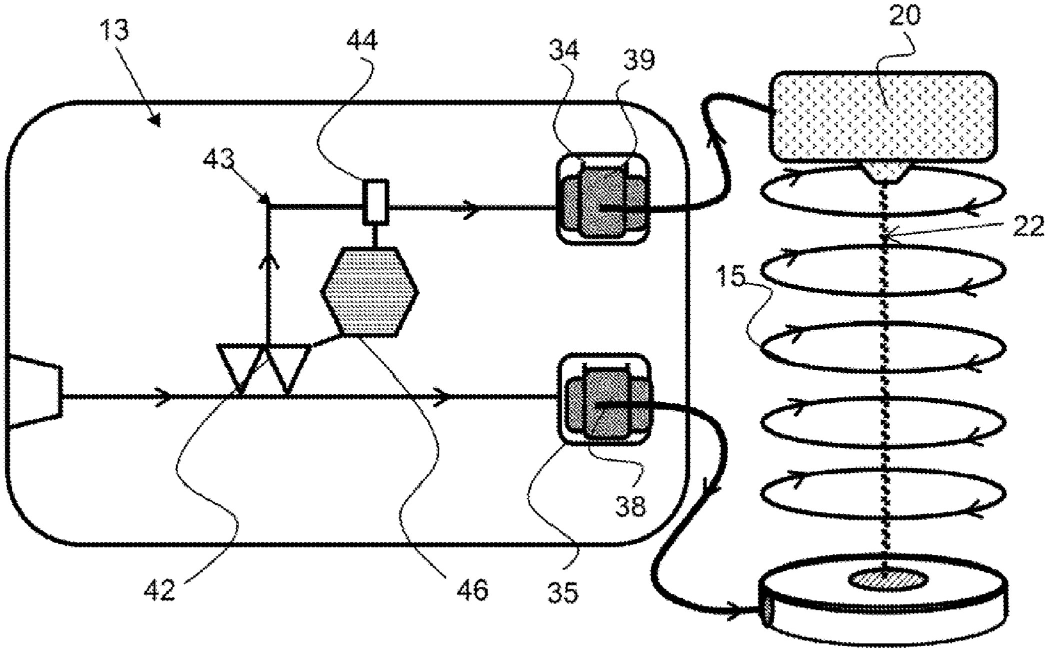

FIG. 6 shows a diagram of an exemplary power control system comprising a power safety feature configured to terminate power to a neutron beam source in the event that no power is being drawn by a containment magnetic coil. The switch is in a closed position and the neutron beam source is activated, as the magnetic coil is drawing power to contain the neutron beam.

Figure 7:
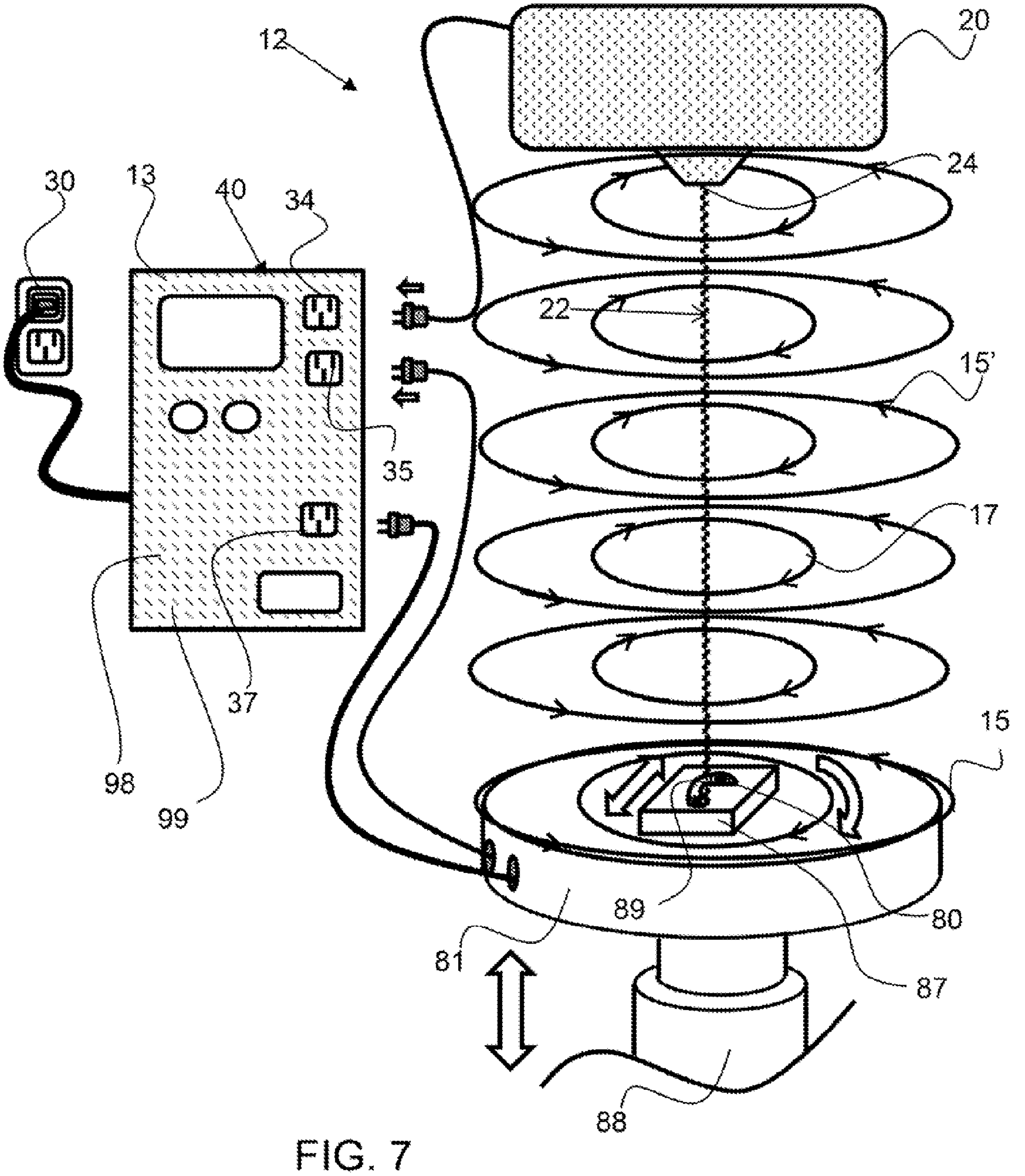

FIG. 7 shows a perspective view of an exemplary neutron beam regulator system comprising a containment magnetic coil configured around a modulating magnetic coil.

Figure 8:
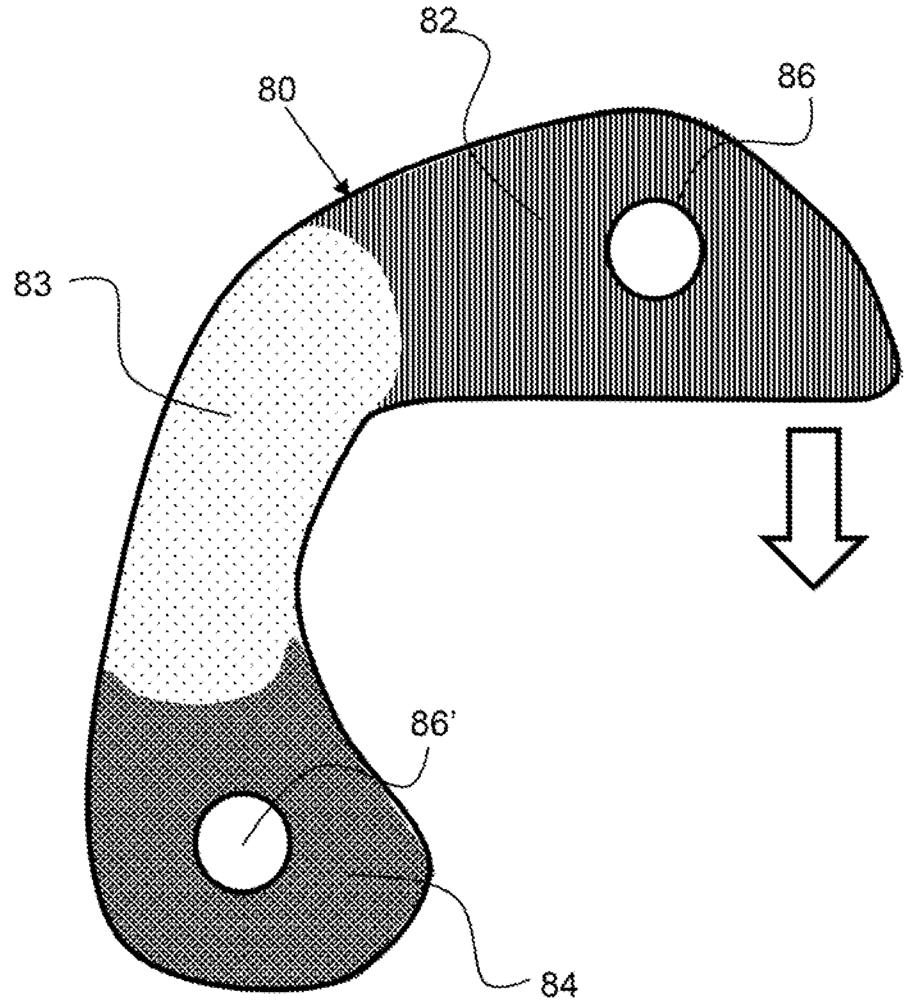

FIG. 8 shows a top-down view of a work-piece having areas treated with different levels of neutron bombardment through magnetic coil modulation.

Figure 9:
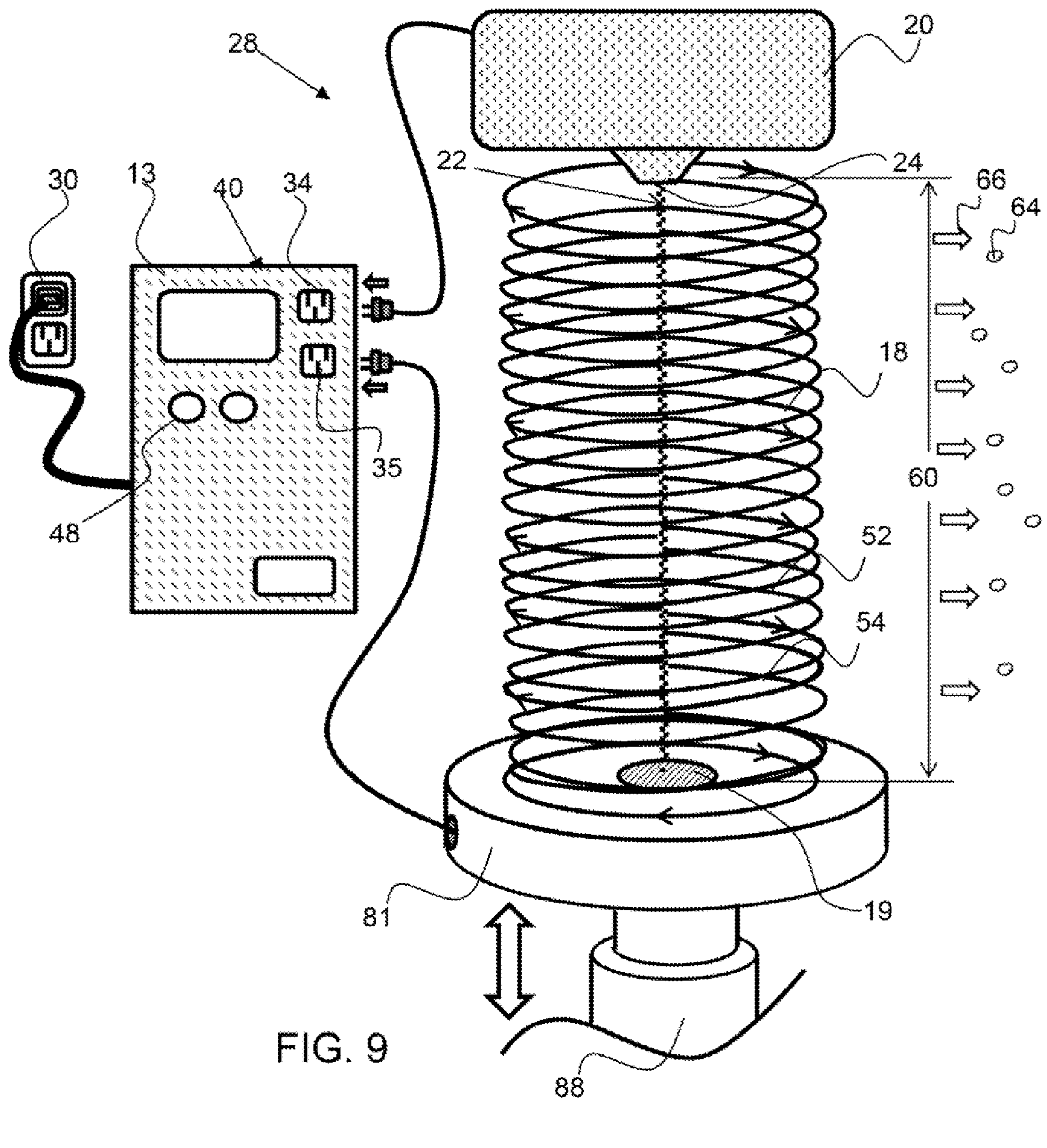

FIG. 9 shows a perspective view of an exemplary neutron beam system comprising a continuous excluding magnetic coil configured around a neutron beam and extending substantially the entire neutron beam length.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are) not to be interpreted as limiting, but merely as a representative basis for teaching one skilled in the art to variously employ the present invention.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown if FIG. 1 an exemplary neutron beam regulator system 12 comprises a power control system 13 and a plurality of discrete magnetic coils 16-16" configured around a neutron beam 22 and extending substantially from the neutron beam source 20 to the target 19, or the neutron beam length 60. Each of the discrete magnetic coils has an individual power supply 35 and individual or discrete magnetic coil plugs 39. This magnetic coil configuration may be configured to both contain the neutron beam and also to modulate the neutron beam through changes in the magnetic field strength or direction. One or more of the discrete magnetic coils may be a modulating magnetic coil 17 and be coupled with a modulating coil output 37. A modulating magnetic coil controller 48 may be configured to enable a user to modulate the level and/or direction of the magnetic field 11 produced by one or more modulating magnetic coils 17. The electrical current running through the coils will produce a magnetic field as indicated by the spiral having an arrow around the coil 11' and will follow the principle of the “right hand rule”. The modulating magnetic coil controller 48 is depicted as a dial but may be any suitable user input device including, but not limited to, a button, knob, computer input screen or field and the like. The power control system 13 is configured in a single power control housing 40 having a single plug for coupling with a power source 30, a neutron beam source power supply output 34 and one or more magnetic coil power supply outputs 35. The containment magnetic coils 15 may produce a magnetic field that that excludes neutrons from outside of the coils from entering and may steer or direct the outside neutrons away from the neutron beam regulator system 12

As shown if FIG. 2, an exemplary neutron beam regulator system 12 comprises a continuous magnetic coil 52 configured around a neutron beam and extending substantially the entire neutron beam length 60. The continuous magnetic coil is a spiraled coil 54 having a continuous length from a first end to a second end, or extending spiraling substantially the entire length of the neutron beam length 60. The continuous magnetic coil may be a containment magnetic coil 15 and may also be configured as a modulating magnetic coil 17. A user may run the neutron beam regulator system with a constant magnetic field intensity whereby the magnetic coil acts simply as a containment magnetic coil. In another embodiment, a user may vary the magnetic field intensity, thereby causing the magnetic coil to be a modulating magnetic coil 17. A neutron beam 22 exits the neutron source 20 at the neutron beam output 24 and extends to a target 19. The target is configured on a work-station 81 having an actuator 88 to move the target up into the magnetic field generated by the magnetic coil 15. The actuator may enable a user to load a work-station with a work-piece for processing and then actuate the part up into the magnetic coil. After the work-piece has been processed, the actuator may move the work-station down and from the magnetic coil to allow a user to remove the work-piece or target. This actuating work-station further reduces neutron radiation exposure by placing the work-piece within the magnetic field. The direction of the electrical current around the coils, as indicated by the arrows tangent with the magnetic coils, produces a magnetic field 11 that contains the neutron beam 22 and also directs it from the beam outlet 24 to the target 19.

As shown if FIG. 3, an exemplary neutron beam regulator system 12 comprises a continuous magnetic coil 52 configured partially around the neutron beam source 20 or generator. The magnetic coil 15 extends upstream of the neutron beam output, or the location where the beam exits the neutron beam generator. Again, this configuration reduces neutron radiation exposure by placing the neutron beam output 24 within the magnetic field.

As shown if FIG. 4, an exemplary neutron beam regulator system 12 comprises a continuous magnetic coil 52 configured partially around the neutron beam source 20 and partially around a work-piece station 81. The magnetic coil extends downstream of where the neutron beam hits the target or work-piece station. This configuration reduces neutron radiation exposure by placing both the neutron beam output 24 and the target within the magnetic field. It is to be understood that additional neutron absorbing material may be configured around the neutron source, the target or work-station, or along the neutron beam length. A magnetic coil may be configured in a housing that comprises neutron absorbing materials such as boron, for example.

As shown if FIG. 5, an exemplary power control system 13 comprises a power safety feature 43 comprising a magnetic coil power sensor 42 and a switch 44 that are configured to terminate power to a neutron beam source 20 in the event that no power, or a power level below some threshold power level, is being drawn by a containment magnetic coil 15. The switch 44 is in an open position and the neutron beam source is deactivated. As shown, the magnetic coil plug 38 is not plugged into the magnetic coil power supply output 35, and therefore no power is being drawn by the magnetic coil 15. A power safety feature may be configured with a magnetic coil power sensor that is coupled with one or more magnetic coil power supply outputs and specifically magnetic coils configured as containment magnetic coils. The neutron beam plug 39 is plugged into the neutron beam power supply output 34 but no power is provided. This safety feature ensures that the neutron beam will not be activated unless a containment magnetic coil is drawing power. A controller 46, such as a microprocessor may be configured to control the functions of the power control system.

As shown if FIG. 6, an exemplary power control system 13 comprises a power safety feature 43 that has enabled power supply to the neutron beam power supply output 34. The switch 44 is in a closed position and the neutron beam source 20 is activated, as the magnetic coil 15 is drawing power to contain the neutron beam 22.

As shown if FIG. 7, an exemplary neutron beam regulator system 12 comprises a containment magnetic coil 15 configured around a modulating magnetic coil 17. The containment magnetic coil is configured to reduce neutron radiation leakage from the system and the modulating magnetic coil is configured to change one or more properties of the neutron beam including, but not limited to, shape, intensity, velocity, direction and polarization. The modulating magnetic coil is inside of the containment magnetic coil in this embodiment. Any suitable combination of containment and modulating magnetic coils may be configure with a neutron beam regulator, as described herein. A containment magnetic coil may be a spiral coil that extends substantially the entire length of the neutron beam, and a modulating magnetic coil may be a discrete coil that is configured more proximal to the target. In another embodiment a modulating coil is a spiral coil that is configured proximal to the target but does not extend to the neutron beam generator. The neutron beam 22 is incident on a work-piece 80 that is configured on a work-piece station 81. A work-piece actuator 87 is configured to move the work-piece in one or more directions to change where the neutron beam hits the work-piece. As shown in FIG. 7, the work-piece actuator is configured to move the work-piece both back and forth, as indicated by the double-ended arrow, and also rotate the work-piece. These two actuation controls will enable the entire work-piece to be treated with the neutron beam. The incident location 89 of the neutron beam on the work-piece may be changed by actuation of the work-piece actuator to allow partial or complete surface treatment of the work-piece. A beam location program 98 is configured with the neutron beam regulator system 12 and enables positive tracking of a neutron beam on a work-piece as the work-piece is moved. A treatment program 99 is configured with the neutron beam regulator system 12 and enables modulation of the neutron beam as a function of position on the work-piece. A treatment program enables a work-piece to be treated with different levels of the neutron beam depending on the position on the work-piece.

As shown if FIG. 8, an exemplary work-piece 80 has areas treated with different levels of neutron bombardment through magnetic coil modulation as indicated by the different shaded areas of the work-piece. This work-piece has two apertures 86, 86', or bolt holes. This particular work-piece needs to be stiff in the areas around these fastening locations as indicated by the dark shaded areas. The work-piece however needs to be more supple, or less stiff, in the portion between the) two apertures, as indicated by the lighter shading. The neutron beam regulator system, as described herein, enables this precise and controlled stiffening of a work-piece through modulated neutron bombardment. The neutron beam shape, intensity, velocity, direction and polarization may modulated by a modulated magnetic coil as incident neutron beam location is changes over the work-piece.

As shown if FIG. 9, an exemplary neutron beam system 28 comprises an excluding magnetic coil 18 that is a continuous magnetic coil 52 configured around the neutron beam and extending substantially the entire neutron beam length 60. The continuous magnetic coil is a spiraled coil 54 having a continuous length from a first end to a second end, or extending spiraling substantially the entire length of the neutron beam length 60. The continuous magnetic coil is an excluding magnetic coil 18 and produces an excluding magnetic field 66 as indicated by the bold arrows. The excluding magnetic field substantially prevents outside neutrons 64 from entering into the coil area, interfering with the neutron beam or impacting the target 19. An excluding magnetic coil may be used in situations where the target is sensitive to neutron and any exposure to stray neutrons may interfere with the target or reflection/diffraction measured from said target. It is to be understood that an excluding magnetic coil may be added to any of the neutron beam regulator systems as defined herein. It is also to be understood that an excluding magnetic coil may be configured as a continuous or discrete coil and may extend at least partially around the target or neutron source output.

DEFINITIONS

A target is any object that a neutron may be incident on for treatment, analysis or conditioning, including neutron bombardment to stiffen or harden a material. A target may be a person's tissue and particularly a tumor. A target may be a physical work-piece that is being analyzed or conditioned through neutron bombardment and may be a metal, plastic, ceramic, composite and the like.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What claimed is:

1. A neutron beam regulator system comprising:
a magnetic coil configured to extend around a neutron beam between a neutron beam source, produced by a neutron beam generator, and a target;
a power control system comprising:
a magnetic coil power supply output;
a neutron beam source power supply output;
magnetic coil power sensor;
a power safety feature configured to prevent power supply to said neutron beam source power supply output when said magnetic coil power supply sensor detects that a power level below a threshold power level is being drawn from the magnetic coil power supply output;
whereby the neutron beam generator will not receive power from the power control system unless the magnetic coil is drawing said threshold power level and producing a confining magnetic field.

2. The neutron beam regulator system of claim 1, wherein the magnetic coil is a substantially continuous coil that extends between a neutron beam source and a target.

3. The neutron beam regulator system of claim 1, comprising a plurality of magnetic coils configured to extend around a neutron beam between a neutron beam source and a target.

4. The neutron beam regulator system of claim 3, wherein the plurality of magnetic coils are discrete coils having discrete coil power inputs.

5. The neutron beam regulator system of claim 4, wherein the power control system comprises a controller that is configured to control power to the plurality of magnetic coils.

6. The neutron beam regulator system of claim 1, wherein the magnetic extends upstream of a neutron beam output.

7. The neutron beam regulator system of claim 1, wherein the magnetic coil extends downstream of a work-piece station.

8. The neutron beam regulator system of claim 1, comprising a work piece station and a work-piece actuator that is configured to actuate a work piece into the magnetic coil.

9. The neutron beam regulator system of claim 1, comprising a modulating magnetic coil controller and wherein the magnetic coil is a modulating magnetic coil configured to produce a magnetic field having a magnetic field strength that is controlled by the magnetic coil controller.

10. The neutron beam regulator system of claim 9, wherein the modulating magnetic coil is a substantially continuous coil that extends between a neutron beam source and a target.

11. The neutron beam regulator system of claim 9, comprising a plurality of modulating magnetic coils configured to extend around the neutron beam between the neutron beam source and the target.

12. The neutron beam regulator system of claim 9, wherein the plurality of modulating magnetic coils are discrete coils each having a discrete coil power input.

13. The neutron beam regulator system of claim 12, wherein each of said plurality of modulating magnetic coils is coupled with a modulating magnetic coil controller.

14. The neutron beam regulator system of claim 9, comprising a work piece station having a work-piece actuator configured to move the work-piece station in one or more directions, wherein the intensity of the neutron beam incident on the work-piece is configured to be modulated over the surface of the work-piece, wherein a first portion of the work-piece may be exposed to a higher intensity neutron beam than a second portion of the work-piece.

15. A neutron beam regulator system comprising:
a magnetic coil configured to extend around a neutron beam between a neutron beam source and a target;
a treatment control system comprising;
work-piece station configured to retain a work-piece;
a work-piece actuate configured to move said work-piece in one or more directions;
a beam location program configured to track the location of said neutron beam with respect to an incident location; and
a beam modulator controller;
wherein the wherein beam modulator controller is configured to control the intensity of the neutron beam as a function of said incident location on said work-piece.

16. The neutron beam regulator system of claim 15, further comprising:
a power control system comprising:
a magnetic coil power supply output;
a neutron beam source power supply output;
a magnetic coil power sensor; and
a power safety feature configured to prevent power supply to said neutron beam source power supply output when said magnetic coil power supply sensor detects no power being drawn from the magnetic coil power supply output;
whereby the neutron beam generator will not receive power from the power control system unless the magnetic coil is receiving power and producing a confining magnetic field.

17. A method of regulating a neutron beam comprising the steps of:
providing a neutron beam regulator system comprising:
a neutron beam source configured to emit a neutron beam from a neutron beam output and comprising a neutron beam plug;
at least one magnetic coil that extends around said neutron beam between said neutron beam output and a target, and comprising an magnetic coil plug, and configured to produce a magnetic field to substantially contain the neutron beam;
a power control system comprising:
a magnetic coil power supply output;
a neutron beam source power supply output;
a magnetic coil power sensor;
a power safety feature configured to prevent power supply to said neutron beam source power supply output when said magnetic coil power supply sensor detects that a power level below a threshold power level is being drawn from the magnetic coil power supply output;
whereby the neutron beam generator will not receive power from the power control system unless the magnetic coil is drawing said threshold power level and producing a confining magnetic field;
plugging said magnetic coil plug into said magnetic coil power supply output of said power control system;
plugging said neutron beam plug into said neutron beam source power supply output of said power control system;
powering on said power control system and thereby enabling power supply to both the magnetic coil and the neutron beam generator and thereby substantially containing the neutron beam within the magnetic coil.

18. The method of regulating a neutron beam of claim 17, wherein the at least one magnetic coil is a substantially continuous coil that extends between a neutron beam source and a target.

19. The method of regulating a neutron beam of claim 17, further comprising the steps of:

providing a modulating magnetic coil controller that is configured to control the magnetic field strength produced by a modulating magnetic coil;

adjusting the modulating magnetic coil controller to change the magnetic field strength produced by said modulating magnetic coil and thereby changing the neutron beam.

20. The method of regulating a neutron beam of claim 19, further comprising the step of:

providing a work piece station having a work-piece actuator configured to move the work-piece station in one or more directions;

placing a work-piece on said work-piece station;

moving said work-piece to change the incident location of the neutron beam on said work-piece; and adjusting the modulating magnetic coil controller to change the magnetic field strength produced by said modulating magnetic coil and thereby changing the neutron beam intensity;

whereby a first location on the work-piece receives a first level of neutron bombardment and a second location on the work-piece receives a second level of neutron bombardment.

21. A method of excluding outside neutrons from a neutron beam system comprising the steps of:

providing a neutron beam system comprising:

an excluding magnetic coil configured to extend around a neutron beam between a neutron beam source, produced by a neutron beam generator, and a target;

a power control system comprising:

a magnetic coil power supply output;

a neutron beam source power supply output;

a magnetic coil power sensor;

a power safety feature configured to prevent power supply to said neutron beam source power supply output when said magnetic coil power supply sensor detects that a power level below a threshold power level is being drawn from the magnetic coil power supply output;

whereby the neutron beam generator will not receive power from the power control system unless the magnetic coil is drawing said threshold power level and producing an excluding magnetic field plugging said magnetic coil plug into said magnetic coil power supply output of said power control system;

plugging said neutron beam plug into said neutron beam source power supply output of said power control system;

powering on said power control system and thereby enabling power supply to both the excluding magnetic coil and the neutron beam generator and thereby substantially excluding said outside neutrons from entering the neutron beam system.

* * * * *